US008366065B2

(12) United States Patent
Kane, Jr. et al.

(10) Patent No.: US 8,366,065 B2
(45) Date of Patent: Feb. 5, 2013

(54) LASER ALIGNMENT DEVICE MAGNETIC SUPPORT STAND

(75) Inventors: Steven Gregory Kane, Jr., Addison, IL (US); George Matthew Davis, Chicago, IL (US); Anthony Caringella, Norridge, IL (US); A. James Walz, Elk Grove Village, IL (US)

(73) Assignee: Illinois Tool Works Inc., Glenview, IL (US)

( * ) Notice: Subject to any disclaimer, the term of this patent is extended or adjusted under 35 U.S.C. 154(b) by 310 days.

(21) Appl. No.: 12/414,789

(22) Filed: Mar. 31, 2009

(65) Prior Publication Data

US 2010/0243833 A1   Sep. 30, 2010

(51) Int. Cl.
*F16M 11/00* (2006.01)

(52) U.S. Cl. ..................................... 248/200; 248/309.4

(58) Field of Classification Search .................. 248/200, 248/205.1, 206.5, 309.4, 310; 211/DIG. 1; 269/1

See application file for complete search history.

(56) References Cited

U.S. PATENT DOCUMENTS

| | | | | |
|---|---|---|---|---|
| 3,491,995 A * | 1/1970 | Taraba | ............................. | 269/8 |
| 4,300,754 A * | 11/1981 | Lawrence | ........................ | 269/8 |
| 5,584,458 A * | 12/1996 | Rando | ...................... | 248/231.41 |
| 6,135,408 A * | 10/2000 | Richter | ...................... | 248/309.4 |
| 6,735,879 B2 | 5/2004 | Malard et al. | | |
| 7,669,814 B2 * | 3/2010 | Bogel | ...................... | 248/163.1 |
| 2002/0117592 A1* | 8/2002 | Traylor | .................... | 248/231.71 |
| 2010/0151953 A1* | 6/2010 | Kuhn et al. | ..................... | 473/15 |
| 2010/0276554 A1* | 11/2010 | Steffen | ....................... | 248/206.5 |
| 2010/0276555 A1* | 11/2010 | Steffen et al. | ............... | 248/206.5 |

FOREIGN PATENT DOCUMENTS

DE                  3005686 A  *  8/1981

OTHER PUBLICATIONS

Pages from the Worldwide Web, located at www.laserlevels.net/plsproductspecs.html, displaying the PLS5 and PLS3 laser tools.
Pages from the Worldwide Web, located at http://www.dewalt.com/us/products/tool_detail.asp?productID=10507, displaying the DeWalt DW087K self-leveling line laser.

* cited by examiner

*Primary Examiner* — Alfred J Wujciak
(74) *Attorney, Agent, or Firm* — Greer, Burns & Crain, Ltd.; Patty Chidiac; Mark W. Croll

(57) ABSTRACT

A laser stand for supporting a laser leveling device during construction involving metal studs and leg tracks provides a planar shelf including a first end and a second end, at least one first leg depending from the first end, at least one second leg depending from the second end, and a magnet enclosure mounted to the second leg and including at least one magnet for supporting the leveling device while attached to the metal stud. The shelf is configured for pivotably accommodating the leveling device and the stand is configured for supporting the leveling device when placed over the leg track on a substrate or attached to the metal stud.

14 Claims, 4 Drawing Sheets

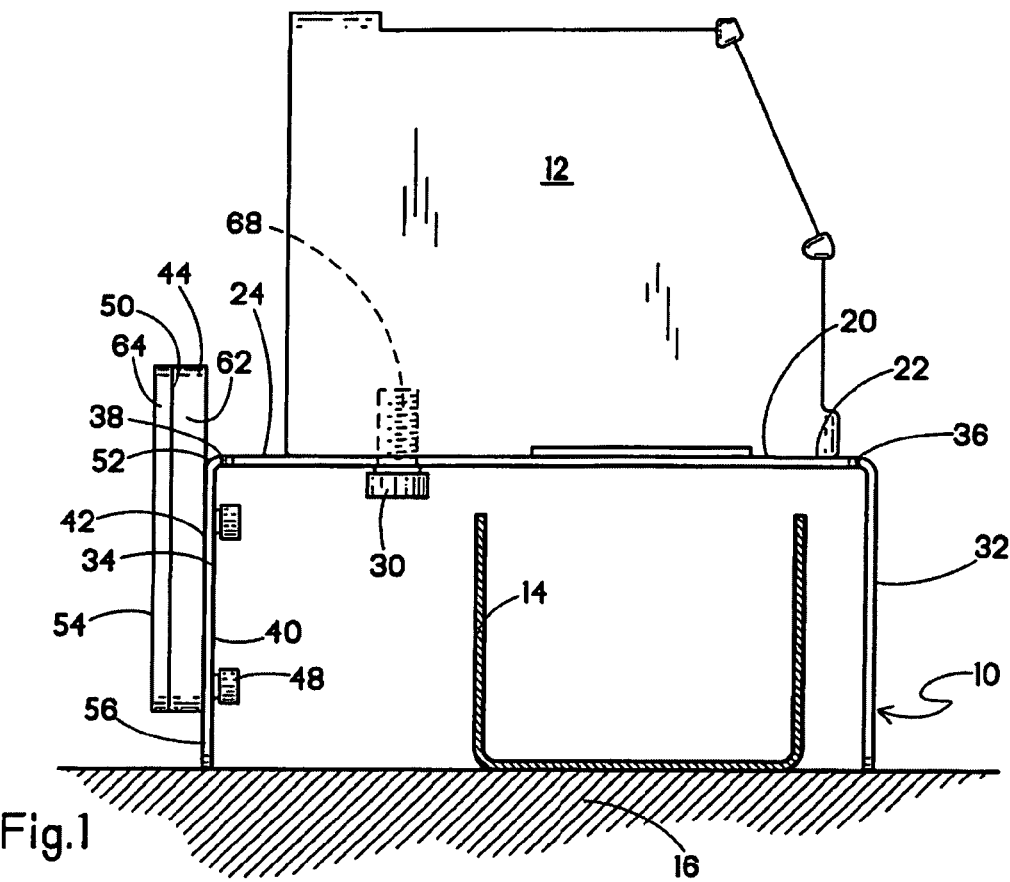
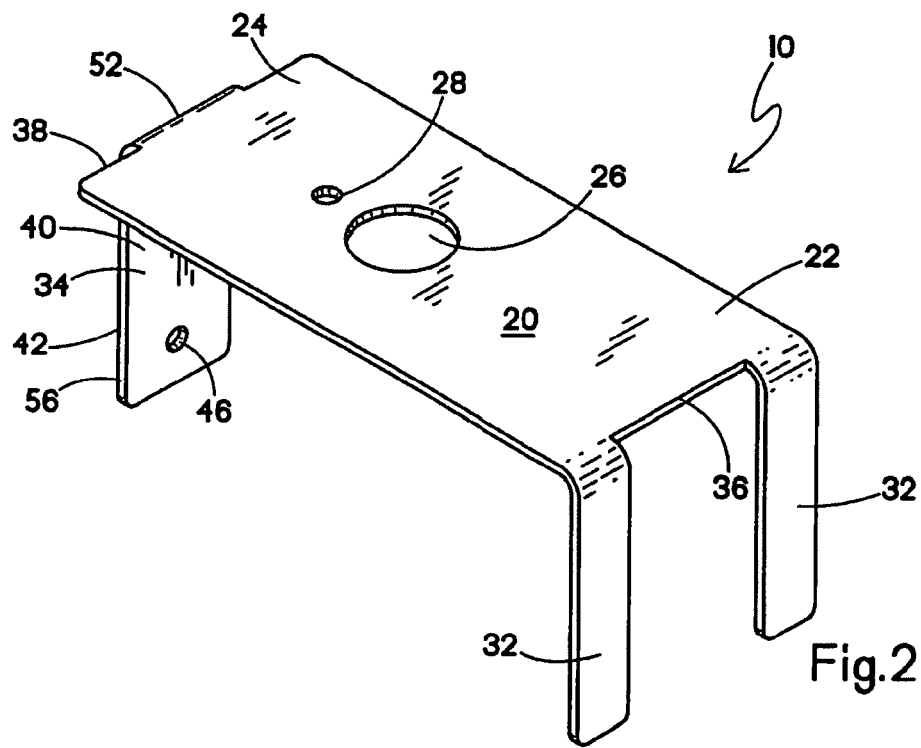

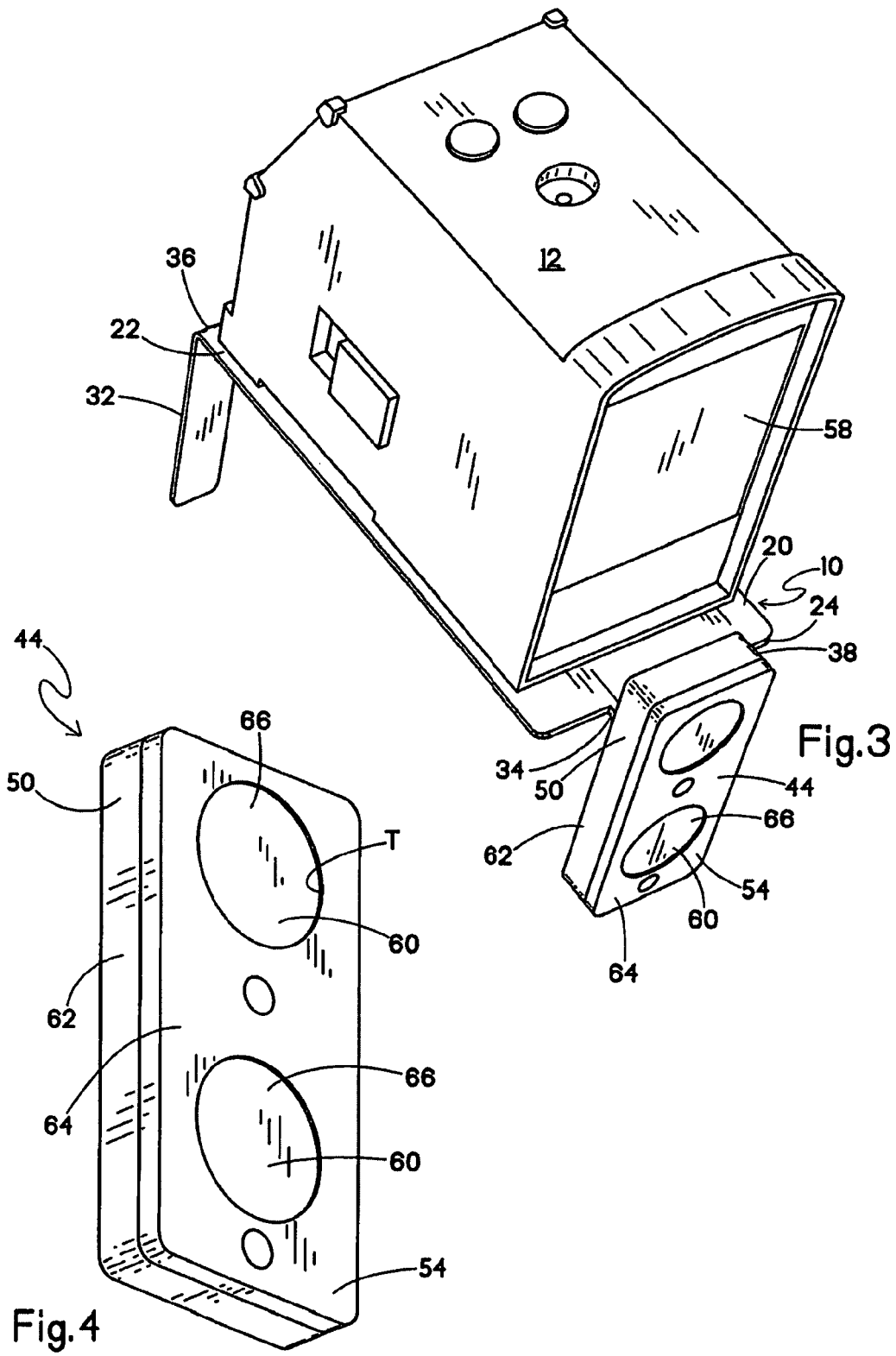

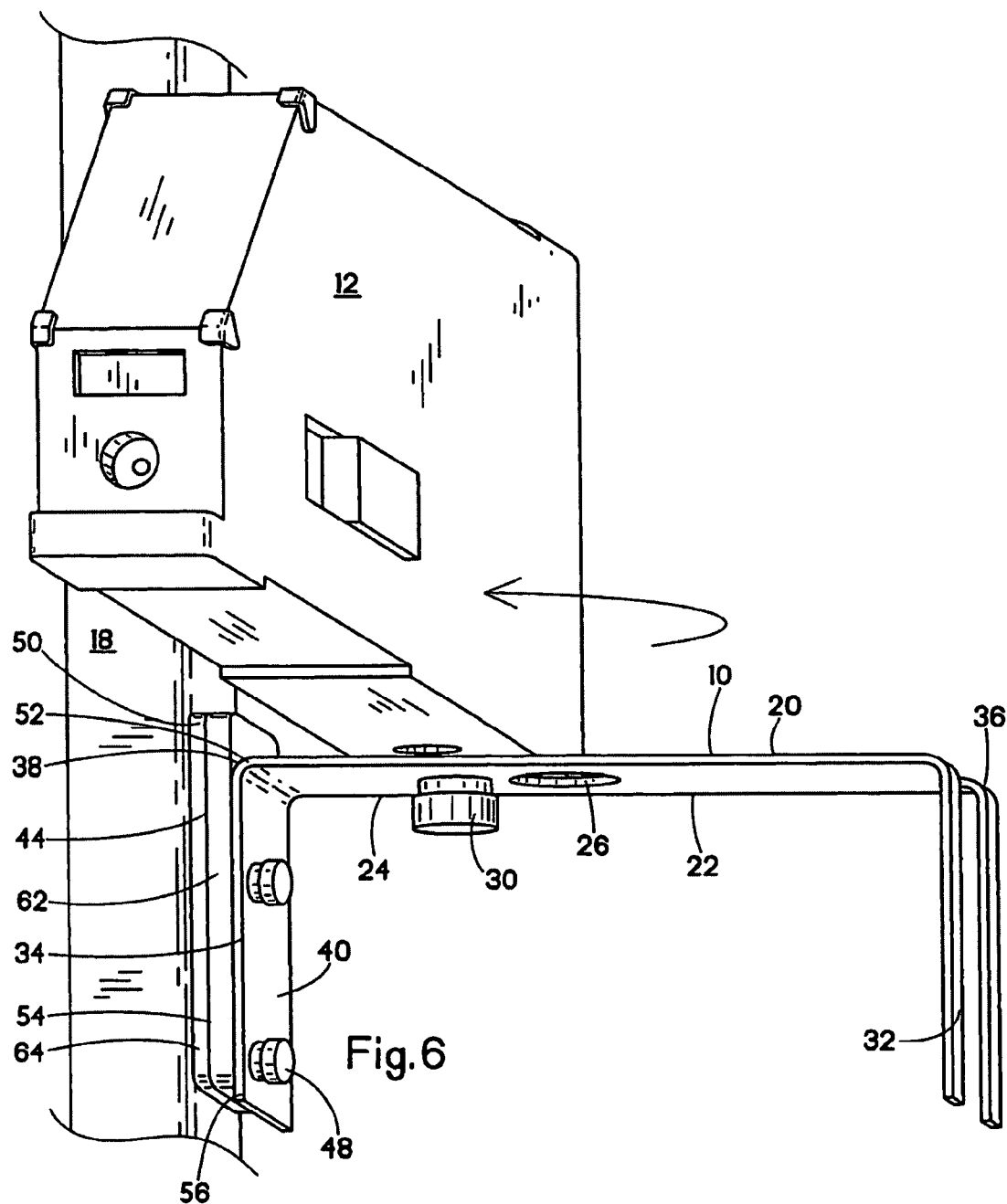

LASER ALIGNMENT DEVICE MAGNETIC SUPPORT STAND

BACKGROUND OF THE INVENTION

The present invention relates generally to laser alignment devices, and more specifically to supports for such devices used in construction environments.

Laser alignment devices are widely used in fields such as building construction and home decorating. For example, alignment is necessary for transferring plumb points from the floor to the ceiling for wallboard leg track layout and lighting installation. Additional applications for laser alignment devices include facilitating proper pre-installation positioning for shelving, electrical outlet and wall ornamentation. In certain applications, such as positioning wallboard track, the laser alignment devices are positioned on a substrate over a metal leg track. Such metal tracks are typically 1-2 inches in height. In other applications, the laser alignment devices are positioned on a vertically oriented metal stud.

A conventional laser alignment device used for such applications is known in the art as a crossline laser. A typical crossline laser includes a line laser that projects two self-leveling laser beams that are perpendicular to each other and form a cross. The device also includes a point laser that projects two self-leveling vertical or plumb laser points. In certain applications, the crossline laser simultaneously emits both a vertical laser and a horizontal laser. A common problem incurred by users of such devices on construction sites is finding a stable location to place the laser so that an accurate display can be obtained.

Accordingly, conventional systems are designed to support crossline laser devices. For example, a conventional laser device includes a magnetic support bracket for mounting the laser to a metal stud. However, when the device is not mounted to the stud, it rests directly upon a floor or substrate and as such, is prone to unstable positioning. Such a bracket is also difficult to use when trying to obtain a plumb line over a wallboard track. Further, the magnet support bracket is designed to only support a specific corresponding leveling device.

In another conventional laser device assembly, a stand is provided for supporting the device when positioned on a substrate over a steel track. However, such a device is difficult to mount on a vertically orientated metal stud. Additionally, the stand is designed to only support a specific type laser device and is prone to unstable positioning from dirt or debris that may be encountered on the substrate.

SUMMARY OF THE INVENTION

The present laser alignment device magnetic support stand addresses the drawbacks of conventional alignment laser support stands. Specifically, the present support stand utilizes a shelf supported by first and second legs and a magnet enclosure mounted to the second leg. An important feature of this stand is that the stand supports a plumb laser device either when positioned on a substrate over a leg track or when attached to a vertical metal stud without changing the configuration of the stand. Another important feature of the present leveling support stand is that the stand is not limited to a specific leveling device and can support different types of conventional laser leveling devices. Yet another feature of the present stand is that the stand is configured for being inverted to accommodate the alignment device between the first and second legs to allow for compact storage.

More specifically, a laser stand for supporting a laser leveling device during construction involving metal studs and leg tracks is provided, including a planar shelf with a first end and a second end, at least one first leg depending from the first end, at least one second leg depending from the second end, and a magnet enclosure mounted to the second leg and including at least one magnet for supporting the leveling device while attached to the metal stud. The shelf is configured for pivotably accommodating the leveling device, and the stand is configured for supporting the leveling device when placed over the leg track on a substrate or attached to the metal stud.

Another embodiment provides a laser leveling assembly configured for compact storage and includes a laser leveling device used in construction applications and capable of emitting a vertical laser and a horizontal laser, and a laser leveling stand for supporting the leveling device while positioned on a substrate or attached to a metal stud. The stand includes a planar shelf including a first end and a second end, an opening for securing the leveling device to the stand with a fastener and an aperture for allowing the vertical laser to be emitted from the leveling device through the shelf, a plurality of first legs depending from the first end, at least one second leg depending from the second end and a magnet enclosure mounted to the at least one second leg and configured for supporting the leveling device while attached to the metal stud, the magnet enclosure including at least one magnet. The stand includes a support position for supporting the leveling device when placed on the substrate over the steel track or attached to the metal stud. The stand also includes a storage position wherein the stand is inverted and attached to the device and is configured for accommodating the leveling device between the plurality of first legs and the at least one second leg.

BRIEF DESCRIPTION OF THE DRAWINGS

FIG. 1 is a side elevation of the present laser alignment device magnetic support stand positioned on a substrate over a U-shaped leg track with the laser alignment device on the stand;

FIG. 2 is a top perspective view of the present laser alignment device magnetic support stand with portions omitted for clarity;

FIG. 3 is top perspective view of the present laser alignment device magnetic support stand with the laser alignment device mounted on the stand;

FIG. 4 is a top perspective view of the magnet enclosure of the present laser alignment device magnetic support stand;

FIG. 6 is bottom perspective view of the present laser alignment device magnetic support stand attached to a metal stud with the laser alignment device shown on the stand and rotated ninety degrees from that shown in FIG. 3.

DETAILED DESCRIPTION

Figure 5:
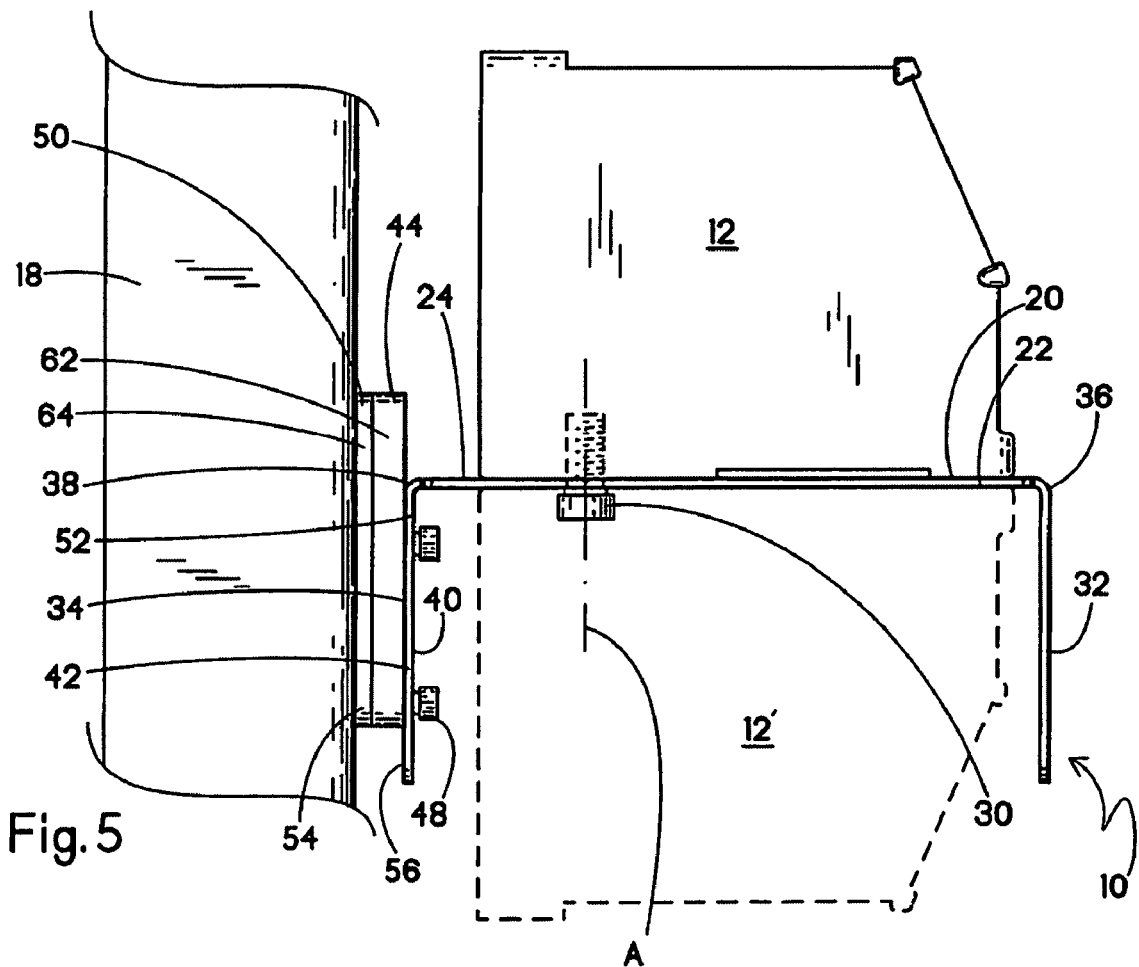
FIG. 5 is side elevation of the present laser alignment device magnetic support stand attached to a metal stud with the laser alignment device on the stand, and laser alignment device attached to the inverted stand is shown in phantom.

Referring now to FIGS. 1-2 and 5, a laser alignment device magnetic support stand is generally designated 10 and supports a laser alignment device 12. For the purposes of this disclosure, "alignment device" and "leveling device" are used interchangeably. As shown in FIG. 1, the stand 10 supports the alignment device 12 when placed over an "L"-shaped leg track 14 on a substrate 16. Alternatively, as shown in FIG. 5, the stand 10 supports the alignment device 12 when attached to a metal stud 18.

Included in the stand 10 is a generally planar shelf 20 having a first end 22 and a second end 24. In a preferred embodiment, the shelf 20 includes a generally circular aperture 26 that allows a vertical laser beam (not shown) emitted from the laser device 12 to pass through the shelf 20 to the substrate. In the present configuration, the aperture 26 is centrally located on the shelf 20 to accommodate the laser beam. However, other positions are contemplated. Additionally, the shelf 20 also preferably includes a generally circular opening 28 for securing the leveling device 12 to the stand 10 using a fastener 30. The diameter of the opening 28 is appropriately sized to accommodate the corresponding fastener 30. Preferably, the opening 28 is positioned closer to the second end 24 than to the first end 22 to allow for pivoting of the leveling device 12. This feature is described in further detail below. In this embodiment, the diameter of the aperture 26 is larger than the diameter of the opening 28. However, other configurations are suitable for the size and shape of the aperture 26 and the opening 28 depending on the application.

As best illustrated in FIG. 2, the first end 22 includes at least one first leg 32, and preferably a pair of spaced first legs. Additionally, the second end 24 includes at least one leg 34. Each leg 32, 34 is generally planar and depends from the shelf 20, such as by being stamped by a press and formed at an approximate right angle to the shelf as is known in the art. It is preferred that the pair of first legs 32 be positioned on a first edge 36 of the shelf 20 and that the second leg 34 be positioned on a second edge 38 of the shelf. In this particular embodiment, the width of each first leg 32 is approximately half the width of the second leg 34. It is also preferred that the first legs 32 are disposed at the corners of the first edge 36 and the second leg 34 is generally centrally located on the second edge 38. The height of each leg 32, 34 is preferably at least two inches such that the shelf 20 will clear the leg tack 14 as seen in FIG. 1. However, other configurations are contemplated for the width, height and placement of the at least one first leg 32 and the second leg 34. While it is preferred that the present stand 10 is stamped from a single sheet of steel and formed, it is contemplated that the shelf 20 and the integrated legs 32, 34 may be made from other light weight and sufficiently strong self-supporting materials.

The pair of first legs 32 and the second leg 34 function together to form a tripod to support the stand 10 when positioned on a substrate 16 such as a floor surface. It should also be appreciated that the above-described configuration provides increased stability while reducing contact between the stand 10 and the substrate 16. This feature enables the leveling device 12 on the stand 10 to self-level despite the normal amount of dust or debris encountered on a typical job site.

Referring now to FIGS. 2-5, the rear leg 34 further includes a first surface 40 and a second surface 42. A magnet enclosure 44 for supporting the stand 10 when attached to the metal stud 18 is mounted to the second surface 42. Additionally, the magnet enclosure 44 may be made from a suitable material such that it may be bonded to the second surface 42 by a chemical adhesive. Preferably, the second leg 34 also includes at least one hole 46 for securing the magnet enclosure 44 to the second leg using at least one fastener 48. In a preferred configuration, the second leg 34 includes a pair of the holes 46. The fastener 48 is preferably contemplated to be a threaded fastener such as a screw as known in the art. However, other equivalent fasteners are contemplated.

As best shown in FIGS. 1, 3 and 5, the magnet enclosure 44 is shown mounted to the second leg 34 second surface 42 such that a top portion 50 of the magnet enclosure extends above an upper edge 52 of the second leg and the shelf 20. Further, a bottom portion 54 of the magnet enclosure 44 is offset from a bottom edge 56 of the second leg 34 such that when the stand 10 is positioned on the substrate 16, the magnet enclosure does not contact the substrate. In addition to protecting the magnet enclosure from debris, this configuration allows only the legs 32, 34 of the stand to contact the substrate 16, and therefore provides additional stability for the stand when positioned on the substrate. The offset configuration of the magnet enclosure 44 also provides improved support for the stand 10 when attached to the metal stud 18. More specifically, this configuration permits the stand 10 to better support the laser device 12 having a center of gravity closer to the second end 24 such as due to placement of at least one battery 58 in the device closer to the stud 18.

Turning now to FIGS. 3-4, the magnet enclosure 44 includes at least one magnet 60, and preferably a pair of magnets attached to or embedded in a base 62 of the magnet enclosure. In this embodiment, the magnets 60 are generally circular discs and are powerful enough to be the only attachment between the combined stand 10 and the alignment device 12 to the metal stud 18. In the preferred embodiment, the magnets 60 are nickel plated neodymium and each has a pull rating of 25.5 lbs. However, other types of magnets 60 are suitable.

The magnet enclosure 44 also includes a resilient surface 64 for further supporting the stand 10 when attached to the metal stud 18. More specifically, the resilient surface 64 creates addition friction between the stand 10 and the stud 18 to prevent the stand from slipping down the stud. Preferably, the resilient surface 64 is a medium soft rubber, and more specifically is approximately 40 A durometers. The resilient surface 64 is also preferably 0.125 inches thick and is attached to the base 62 using chemical adhesive. In the preferred embodiment, the resilient surface 64 covers the entire base 62 except for an outer surface 66 of the magnets 60. Other configurations and materials for the resilient surface 64 are also contemplated, such as a plurality of smaller, spaced resilient surfaces.

As best illustrated in FIGS. 3 and 4, the resilient surface 64 also extends a specified standoff distance "T" beyond the outer surface 66 of the magnet 60. In this embodiment, the preferred specified standoff distance "T" is 0.015 inches. However, other distances are contemplated provided they enable the magnets 60 to positively grip the metal stud 18 and thus satisfactorily support the device 12. This preferred configuration of the magnet enclosure 44 employing both the magnets 60 and the resilient surface 64 allows for increased grip of the stand 10 when attached to the metal stud 18.

Referring to FIGS. 1, 2 and 5, as previously indicated, the shelf 20 includes the opening 28 for securing the leveling device 12 to the stand 10 using the fastener 30. Preferably, the fastener 30 is sized to prevent the fastener from bottoming out when threadably engaged into a threaded socket 68 (shown hidden in FIG. 1) in the leveling device 12. This feature permits the leveling device 12 to be securely attached to the stand 10 even if dirt or debris builds up inside the threaded socket 68. In the present embodiment, the fastener 30 is a ¼-20 screw, but fasteners of different types and lengths are considered suitable depending on the application.

Referring now to FIG. 6, the leveling device 12 is pivotable on the stand 10 about an axis "A" defined by the fastener 30. In this embodiment, the opening 28 is positioned closer on the shelf 20 to the second end 24 than to the first end 22 to accommodate pivoting of the leveling device 12 about the fastener 30. As shown in FIG. 6, the device pivots about the fastener 30 between a position parallel with a longitudinal axis of the shelf 20 and up to 180 degrees about the vertical axis "A". Further, the stand 10 allows for pivoting of the device 12 when the stand is attached to the metal stud 18 or when the stand is positioned on the substrate 16. While two positions of the device 12 on the shelf 20 are shown in FIGS. 3 and 6, it is contemplated that the device is securable in any pivoted position relative to the stand 10 within a 180 degree arc. It will also be understood that the plumb laser will not pass through the aperture 26 when pivoted from the aligned positioned shown in FIG. 3.

Importantly, the present stand 10 is configured for supporting the leveling device 12 while emitting simultaneously a horizontal laser beam and a vertical laser beam when placed on the substrate 16 over the leg track 14 or when attached to the metal stud 18. As also should be appreciated, the present stand 10 provides sufficient stability for supporting the leveling device such that the device 12 can self-level even when typical workplace debris is encountered.

Referring now to FIG. 5, an additional aspect of the present stand 10 is that it is invertable relative to the device 12 for compact shipping or storage. In this configuration, the stand 10 has a support position for supporting the leveling device when placed on the substrate 16 over the steel track 14 or when attached to the metal stud 18 (shown in solid lines). Additionally, the stand 10 has a storage position for accommodating the leveling device 12 between the first legs 32 and the second leg 34. To achieve the storage position, the fastener 30 is loosened and removed, and the stand 10 is inverted relative to the device 12 (shown in FIG. 5 in phantom as 12'). This second position provides for compact storage and packaging of the stand 10 and the leveling device 12.

While a particular embodiment of the present laser alignment device magnetic support stand has been shown and described, it will be appreciated by those skilled in the art that changes and modifications may be made thereto without departing from the invention in its broader aspects and as set forth in the following claims.

What is claimed:

1. A laser stand for supporting a laser leveling device during construction involving metal studs and leg tracks, comprising:
   a planar shelf including a first end and a second end;
   a pair of first legs being spaced apart and depending from said first end;
   at least one second leg depending from said second end;
   a magnet enclosure mounted to said second leg and including at least one magnet for supporting the leveling device while attached to the metal stud;
   said shelf configured for pivotably accommodating the leveling device; and
   said stand configured for supporting the leveling device when placed over the leg track on a substrate or attached to the metal stud;
   wherein said planar shelf further includes a first aperture for allowing a vertical laser to be emitted from the laser leveling device and to pass through said aperture while the device is positioned on said stand and a second aperture configured for attaching the leveling device to said stand using at least one fastener so that the leveling device is pivotable about said fastener.

2. The laser stand of claim 1 wherein said at least one first leg and said at least one second leg are planar.

3. The laser stand of claim 1 wherein said at least one first leg and said at least one second leg are integrally formed with said shelf.

4. The laser stand of claim 1 wherein said at least one first leg is positioned on an edge of said first end and said at least one second leg is positioned on an edge of said second end.

5. The laser stand of claim 1 wherein a height of said at least one first leg and said at least one second leg is at least 2 inches.

6. The laser stand of claim 1 wherein a width of said at least one first leg is half a width of said at least one second leg.

7. The laser stand of claim 1 wherein said magnet enclosure further includes a resilient surface for further supporting said laser stand while attached to the metal stud, and wherein said resilient surface extends a specified standoff distance beyond an outer surface of said at least one magnet.

8. The laser stand of claim 1 wherein said planar shelf includes an opening configured for attaching the leveling device to said stand using at least one fastener and the leveling device is pivotable about said fastener.

9. The laser stand of claim 8 wherein said opening is positioned closer to said second end than said first end to accommodate pivoting of the leveling device about said fastener between a position parallel with a longitudinal axis of said shelf and 180 degrees about a vertical axis.

10. The laser stand of claim 8 wherein said at least one fastener is sized to prevent bottoming out when said at least one fastener is engaged into a threaded socket in the leveling device.

11. The laser stand of claim 1 wherein said magnet enclosure is mounted to at least one said second leg such that a top portion of said magnet enclosure extends above an upper edge of said second leg, and a bottom portion of said magnet enclosure is offset from a bottom edge of said second leg such that said magnet enclosure does not contact the substrate when said stand is positioned on the substrate.

12. The laser stand of claim 1 wherein said magnet enclosure further comprises a plurality of said magnets for supporting said stand against the metal stud.

13. The laser stand of claim 1 wherein said planar shelf is elongated and forms a generally polygonal shape when viewed from above.

14. A laser leveling assembly configured for compact storage, comprising:
   a laser leveling device used in construction applications and capable of emitting at least one of a vertical laser and a horizontal laser; and
   a laser leveling stand for supporting the leveling device while positioned on a substrate or attached to a metal stud, said stand comprising:
   a planar shelf including a first end and a second end, an opening for securing the leveling device to said stand with a fastener and an aperture for allowing the vertical laser to be emitted from the leveling device through said shelf;
   a plurality of first legs depending from said first end;
   at least one second leg depending from said second end;
      a magnet enclosure mounted to said at least one second leg and configured for supporting the leveling device while attached to the metal stud, said magnet enclosure including at least one magnet;
      said stand including a support position for supporting the leveling device when placed on the substrate over the steel track or attached to the metal stud; and
      said stand includes a storage position wherein said stand is inverted and attached to the device and is configured for accommodating the leveling device between said plurality of first legs and said at least one second leg;

wherein said planar shelf further includes a first aperture for allowing a vertical laser to be emitted from the laser leveling device and to pass through said aperture while the device is positioned on said stand and a second aperture configured for attaching the leveling device to said stand using at least one fastener so that the leveling device is pivotable about said fastener.

* * * * *